UNITED STATES PATENT OFFICE.

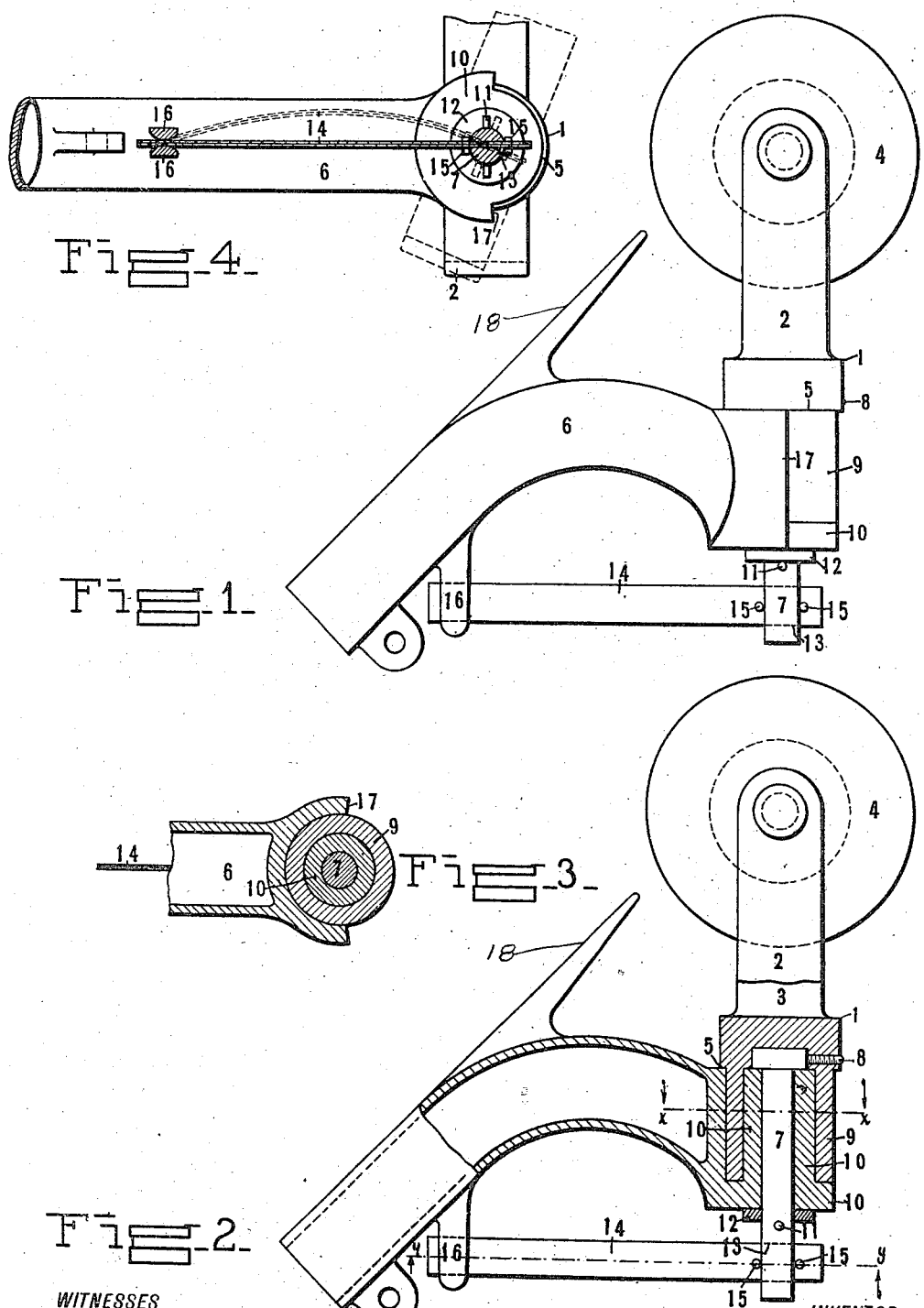

EDWARD ALAN SULLIVAN, OF TORONTO, ONTARIO, CANADA, ASSIGNOR TO ELECTRIC RAILWAY SUPPLIES, LIMITED, OF TORONTO, CANADA, A CORPORATION OF ONTARIO, CANADA.

TROLLEY.

1,043,879.  Specification of Letters Patent.  Patented Nov. 12, 1912.

Application filed May 1, 1909. Serial No. 493,241.

*To all whom it may concern:*

Be it known that I, EDWARD A. SULLIVAN, a subject of the King of Great Britain, residing at Toronto, in the county of York and Province of Ontario, Dominion of Canada, have invented certain new and useful Improvements in Trolleys, of which the following is a full, clear, and exact description, such as will enable others skilled in the art to which it appertains to make and use the same.

This invention relates to trolley pole heads and particularly that style in which the head or wheel is pivotally mounted with relation to the trolley pole whereby the trolley wheel may adjust itself to curves, irregularities or deviations in either the track or wire.

One of the objects of this invention is to provide a practical and highly efficient trolley pole head of the above style that will be simple in construction and cheap to manufacture.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is shown one of various possible embodiments of this invention, Figure 1 is a side elevation of a preferred form of my invention; Fig. 2 is a similar view partly in section of the device shown in Fig. 1; Fig. 3 is a horizontal section taken on the line x—x of Fig. 2; Fig. 4 is a detailed view partly in section taken on the line y—y, Fig. 2.

In order that certain features of this invention may be the more readily understood, it may here be noted that when a car is rounding a curve, the longitudinal axis of the car is not parallel to the trolley wire at the point of contact between the trolley wheel and the wire, for the car enters the curve while the trolley wheel, which is practically over the rear end of the car, is still on the straight wire. At this instant the trolley pole is at an angle to the wire and in constructions now generally in use, the harp, being rigidly attached to the pole, will tend to cause the wheel carried thereby to leave the wire at this point, as the latter cannot conform itself to the vertical plane of the wire so that it will lie properly in the groove provided for it.

Referring to these figures, illustrating one embodiment of my invention in which similar reference characters refer to corresponding parts in the several views, 1 represents a harp having arms 2 and 3 preferably integral therewith supporting a trolley wheel 4, but it will, of course, be understood that they may be made separate from one another and united in any suitable manner although the integral construction possesses many advantages. The lower part of this harp 5 is adapted to engage a portion of a member 6 which is integral with, or separate from and adapted to be secured to a trolley pole. In the present form it is shown as a separate part.

The base of the harp is recessed on its underside adapted to receive a pivot-pin 7 which is secured to the harp in any desired manner, as by means of a set screw 8. It is to be understood that this pin 7 may be made integral with the harp if desired, but it is, of course, obvious that by making it separate and detachably connecting it to the harp it may be easily replaced when worn out without throwing away the entire harp. A sleeve 9, which is also preferably integral with the lower part of the harp, surrounds the pivot-pin 7, leaving an annular space between the same adapted to receive a collar or sleeve 10 carried by pole member 6. The pin 7 extends downwardly through this last-mentioned collar 10 and is provided near the middle with a hole adapted to receive a pin 11 for holding a bearing plate 12 in place, thereby securing the trolley harp to the pole member, but permitting a rotative movement of the engaging parts. The lower part of the pivot-pin is provided with a longitudinal slot 13 adapted to receive the ends of one or more thin, flat springs 14 for holding or restoring the wheel to normal position. A spring construction composed of a plurality of springs as shown has the obvious advantage of increased strength and flexibility. Suitable securing means such as pins 15 are provided to hold the springs in place and the opposite ends of the springs engage a recess between rounded pins or lugs 16 on the member 6 in such a manner as to permit a sliding movement between the parts when the spring is flexed, as will be hereinafter described and as shown in dotted lines in Fig. 4.

There is provided on the member 6 besides the collar 10 a semi-annular part 17 on which rests the overhanging portion 5 at the lower end of the harp in such a manner as to permit an added bearing surface.

The member 6 which is adapted to be connected to the pole at its lower end is bent downwardly at its upper end so that the pivotal connection between this member and the harp is in substantially a vertical line. The advantage of this construction lies in the fact that the entire force exerted between the spring of the trolley pole and the wire is along the longitudinal axis of the pivotal connection, thereby avoiding wear on the side walls thereof, and the elimination of friction incident thereto. It also lessens the possibility of the harp becoming detached from the pole member if the set screw 8 should become loosened as otherwise might occur if the harp was at an angle to the pivot. In this construction there is also less danger of the strength of the pole spring overcoming the strength of the springs 14 and forcing the wheel sidewise from the wire as, for instance, when the pole is pressed close to the roof of the car as it passes under a bridge.

On the upper part of member 6 is provided a projecting guard arm 18 extending to a point almost in contact with the trolley wheel for the purpose of engaging span wires and guiding the same up over the wheel if it should accidentally leave the wire while the car is in motion. Otherwise the wire would probably catch under the wheel and bend if not break the pivotal connection.

Having thus described the construction of one embodiment of my invention, the manner of operation thereof is probably obvious, or may be readily understood. When the car is traveling on a straight track the head is normally in the position shown in Fig. 1 but as the car starts to round a curve the pole which is usually attached to the car near the center of the roof begins to turn before the wheel, which is usually over the rear end of the car, reaches the curve. If the wheel was not pivotally connected to the pole at this instant, it would be turned at an angle with the wire and cause unnecessary wear as well as a tendency for the wheel to leave the wire. As it is, however, the wheel turns on its pivotal connection and remains in the vertical plane of the wire at the point of contact as shown in the dotted lines in Fig. 4. When the car goes on to the straight track the operation is reversed, due to the angle existing between the car which is on the straight track and the wheel which is still on the curve.

It will be seen from the above description that the device is a practical, efficient and economical construction that may easily be applied to any of the usual forms of trolley poles by simply removing the head now in use and substituting the improved form.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:—

1. In a device of the class described, in combination, a trolley pole member, and a harp, said member and harp each having a plurality of closely adjacent interfitting parts forming a pivotal connection about which the harp may turn the parts of one alternating with the parts of the other.

2. In a device of the class described, in combination, a trolley pole member having an annular collar and a semi-annular part, and a harp the lower part of which forms a pivotal connection with said member between and in contact with said collar and part.

3. In a device of the class described, in combination, a pole member having a plurality of concentrically curved portions and a hole passing through the center thereof, a harp, a pivot pin carried thereby passing through said hole, a collar on said harp interfitting between said curved portions on said pole member and a spring between the pole member and the pivot pin for maintaining the parts in a predetermined relation, said pin and collar alternately interfitting with said curved portions.

4. In a device of the class described, in combination, a trolley pole member having a collar cast integrally therewith and provided with an opening therethrough, a semi-circular collar concentric with said first-mentioned part on said pole member, a harp having a collar interfitting with the collar and semi-circular part on said pole member, and means for holding said parts in engagement.

In testimony whereof I affix my signature, in the presence of two witnesses.

EDWARD ALAN SULLIVAN.

Witnesses:
E. MERNER,
R. N. SCHEFFER.